United States Patent [19]
Takebayashi et al.

[11] Patent Number: 5,176,456
[45] Date of Patent: Jan. 5, 1993

[54] ROLLING BEARING

[75] Inventors: Hiroaki Takebayashi; Kiyoshi Tanimoto; Kazuhisa Kitamura, all of Osaka, Japan

[73] Assignee: Koyo Seiko Co., Ltd., Osaka, Japan

[21] Appl. No.: 728,787

[22] Filed: Jul. 2, 1991

Related U.S. Application Data

[63] Continuation of Ser. No. 513,629, Apr. 23, 1990, abandoned.

[30] Foreign Application Priority Data

May 1, 1989 [JP] Japan .................. 1-51822[U]

[51] Int. Cl.$^5$ .................. F16C 33/58; F16C 43/00
[52] U.S. Cl. .................. 384/493; 384/492; 384/537
[58] Field of Search .................. 384/492, 493, 907.1, 384/510, 513, 537, 569, 585, 558

[56] References Cited

U.S. PATENT DOCUMENTS

| | | | |
|---|---|---|---|
| 2,082,379 | 6/1937 | Brittain, Jr. .................. | 384/585 X |
| 3,910,656 | 10/1975 | Price et al. .................. | 384/558 |
| 4,770,549 | 9/1988 | Rokkaku et al. .................. | 384/492 |
| 4,792,244 | 12/1988 | Yamashita et al. .................. | 384/537 X |
| 4,808,014 | 2/1989 | Ueda et al. .................. | 384/492 |

OTHER PUBLICATIONS

SAE Technical Paper Series 850764, "Numerical Procedure for Designing Rolling Element Contact Geometry as a Function of Load Cycle" by Michael R. Hoeprich Apr., 1985.

Primary Examiner—Thomas R. Hannon

[57] ABSTRACT

A rolling bearing suitable for use in a high temperature atmosphere is provided.

The bearing is partly or entirely made of a ceramic material with at least its inner ring being made of a ceramic material so as to improve the rotational and antiabrasive efficiencies thereof in a high temperature operating condition.

Further, in order to prevent both chamfered ends of the inner ring from cracking or chipping, the inner peripheral surface is crowned to have a Lundberg profile thereby avoiding a local concentration of stress on the inner ring.

6 Claims, 2 Drawing Sheets

F I G. 1
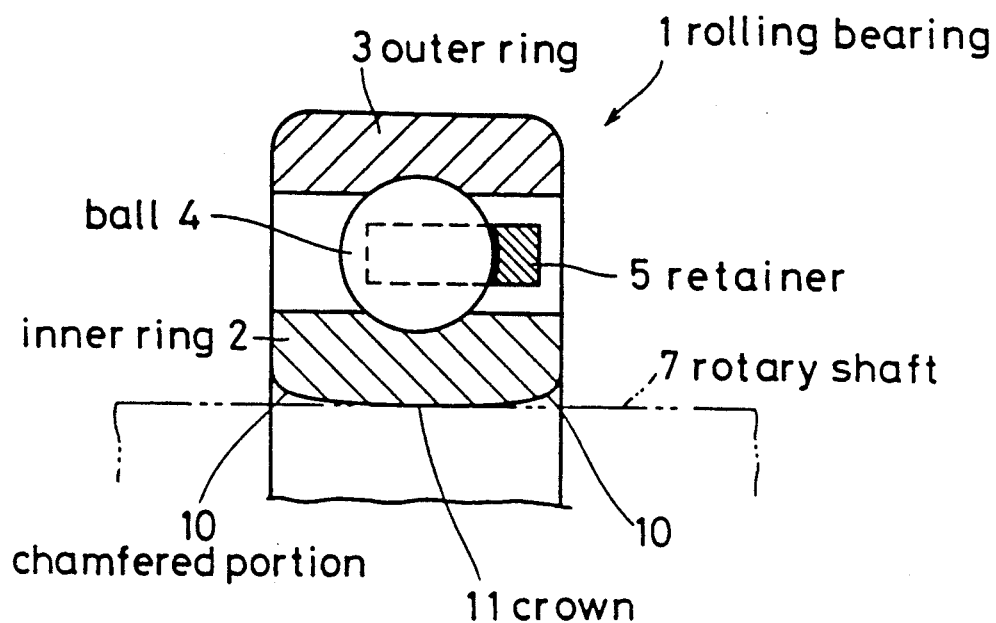
F I G. 2
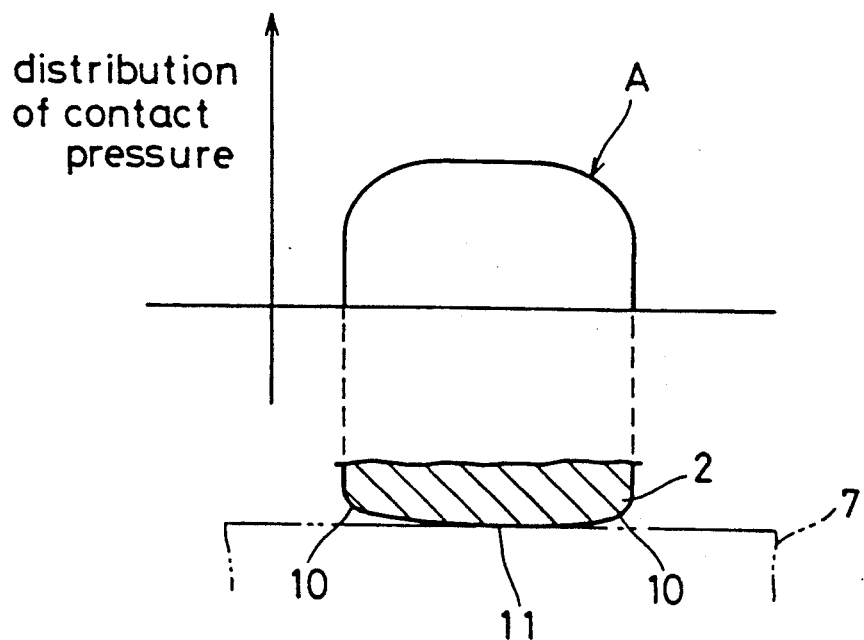

ROLLING BEARING

This application is a continuation, of application Ser. No. 07/513,629 filed on Apr. 23, 1990, now abandoned.

BACKGROUND OF THE INVENTION

The present invention relates to rolling bearings partly or entirely made of a ceramic material used in a high temperature atmosphere.

The formation of an oxide film on the surface of a semiconductor wafer or the diffusion of impurities into the semiconductor wafer is performed in a high temperature furnace. The semiconductor wafer to be subjected to such treatment is usually placed on a carriage and transferred inside the high temperature furnace and after completion of the treatment, it is transferred outside the furnace together with the carriage.

Rolling bearings used for the wheels of the carriage are comprised of ceramic rolling members formed of balls or rollers, an inner ring and an outer ring both of which are made of steel. Also, the type are used that comprise an inner ring, an outer ring and rolling members all of which are made of ceramic rolling bearings.

That is, in the case of a rolling bearing having inner and outer rings and rolling members all made of steel material, it is necessary for the bearing to be lubricated with a lubricating oil so as to increase the antiabrasive as well as rotational efficiencies of the bearing but such lubricating oil tends to evaporate at high temperatures resulting in deterioration of these efficiencies. In contrast, a rolling bearing made of a ceramic material requires no lubrication.

The rolling bearing according to the present invention is of the type that includes at least a ceramic inner ring. However, where such a bearing is used for a carriage, the following problems arise.

That is, when the bearing having the ceramic inner ring attached to the steel shaft is used in a high temperature atmosphere, the shaft greatly expands with a temperature rise because there is a large difference in the coefficient of thermal expansion between the inner ring and the steel shaft (i.e., ceramics: $2.5-3 \times 10^{-6}$, steel: $11.6 \times 10^{-6}$) while the inner ring hardly expands as shown by the solid line A of FIG. 3 which is indicative of a distribution of the contact pressure between the inner ring and the shaft, an excessive stress concentrates on an edge $10a$ at each of the chamfered portions $10$ formed at both axial ends of the inner ring $2$. In this case, as the ceramic material is relatively weak as compared to steel, the edge portion $10a$ of the inner ring $2$ is sometimes chipped or cracked. Further, due to the above disadvantage, the freedom of design relating to the fit between the shaft and the inner ring has been restricted so that it has been difficult to realize a structure satisfying the fit by which a favorable rotational efficiency is obtained.

Further, if, in the above case, the shaft is made of a ceramic material, the problem arising from the difference in the coefficient of thermal expansion between the shaft and the inner ring will be solved with surety but the cost will greatly increase. Therefore, it is quite unfavorable to form the shaft with the ceramic material especially for the above kind of carriage that is desired to be of a simple structure and to be manufactured at a low cost.

The present invention has been made in view of the above circumstances and an object of the invention is to provide a rolling bearing at least whose inner ring is made of a ceramic material and which is free of local concentration of stress on the inner ring due to the use of a steel shaft on which the inner ring is mounted and which is capable of bearing a heavy load without causing the ceramic inner ring to crack or chip.

Another object of the invention is to provide a roller bearing which allows of a wide range of freedom of designing a fitting structure between the shaft and the inner ring.

SUMMARY OF THE INVENTION

In order to achieve the above-described objects, the rolling bearing according to the present invention comprises an inner ring, an outer ring arranged relative to the inner ring and a plurality of rolling members disposed between the inner ring and the outer ring and is characterised in that the inner ring is made of a ceramic material, the inner peripheral surface of the inner ring is chamfered at both ends thereof and crowns are respectively formed inside the chamfered portions so as to eliminate edgings which would otherwise remain internally of that portions as a result of chamfering.

Basically, each of the above crowns may be formed at a desired position suitable for eliminating the edgings due to chamfering but, for example, it may be a part of a crown having a configuration (Lundgerg profile) based on a logarithmic curve crowning formed on the entire inner peripheral surface of the inner ring.

Further, the rolling bearing of the present invention may be of any structure if at least the inner ring thereof is made of a ceramic material so that both the outer ring and rolling members thereof may be made of a ceramic material altogether or only the rolling members may be made of a steel material.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given hereinbelow and the accompanying drawings which are given by way of illustration only, and thus, are not limitative of the present invention, and wherein:

FIG. 1 is a vertical sectional view of an upper half of a rolling bearing according to the present invention;

FIG. 2 is a diagram showing a distribution of pressure applied on the contact surface of an inner ring of the bearing according to the invention with respect to a rotary shaft.

DETAILED DESCRIPTION OF PREFERRED EMBODIMENT

Figure 3:
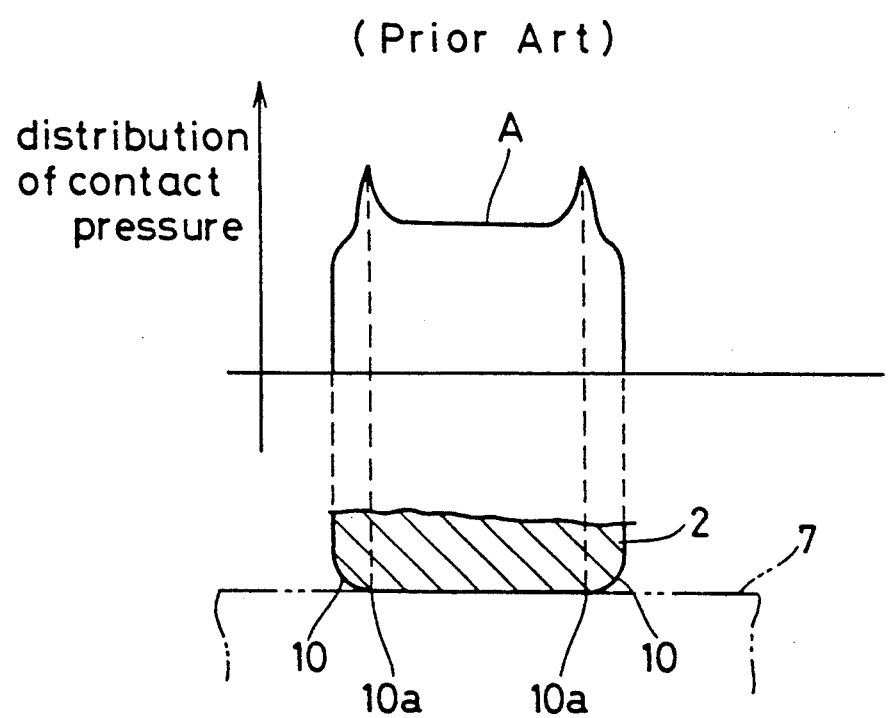
FIG. 3 is a diagram similar to that of FIG. 2 especially when a conventional bearing is used.

FIGS. 1 and 2 show one embodiment of a rolling bearing according to the present invention.

In this embodiment, description will be made with reference to a deep groove ball bearing. The deep groove ball bearing comprises an inner ring $2$, an outer ring 3 and a plurality of balls 4 interposed between the former two as they are retained by a retainer 5. In this case, the inner ring 2, the outer ring 3 and the balls 4 are all made of a ceramic material such as a sintered body mainly consisting of silicon nitride. The retainer 5 may be made of a metal or synthetic resin material.

Further, the inner ring 2 has spherical chamfered portions 10 at both ends of the inner peripheral surface thereof, respectively, and the area between both chamfered portions is crowned as at 11 in a somewhat exagerated form. It is preferable that the crown 11 have a configuration (i.e., the Lundberg profile given in the SAE Technical Paper Series 850764, Apr. 15–17, 1985 v.) based on the most desirable logarithmic crowning.

Now, how the rolling bearing 1 having the inner ring 2 of the above type mounted on a steel rotary shaft 7 designated by the hypothetical line of FIG. 1 operates in a high temperature atmosphere will be described.

When the diameter of the rotary shaft 7 thermally expands due to a temperature rise, the contact pressure of the rotary shaft 7 with respect to the inner ring 2 increases but due to the formation of the crown 11, the distribution of the contact pressure will be as expressed by the letter A of FIG. 2. That is, because of the absence of edgings at both end portions of the inner peripheral surface of the inner ring 2 due to the presence of the crown 11, the concentration of stress on the end portions as has hitherto been experienced is avoided so that the load based on the stress is applied substantially uniformly over the entire surface of the inner ring 2 in the axial direction.

The crown 11 may be formed only at each of the end portions as has conventionally been done but when it is in the form of the above-mentioned logarithmic curve and formed over the entire inner peripheral surface of the inner ring 2, the stress concentration can be avoided throughout the entire inner peripheral surface of the ring in a better manner. Further, with regard to the interference between the inner ring 2 and the steel rotary shaft 7, it is possible to apply the technique described in U.S. Pat. No. 4,808,014 assigned to the present applicant.

Although the instant embodiment has been described only with respect to the deep groove ball bearing, the rolling bearing of the present invention is applicable to all kinds of rolling bearings each having a ceramic inner ring.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A bearing structure for a high temperature atmosphere comprising:
    a rolling bearing having an inner ring, an outer ring arranged relative to the inner ring, and a plurality of rolling members disposed between the inner ring and the outer ring;
    said inner ring being made of a ceramic material, both ends of the inner peripheral surface of the inner ring being chamfered and crowns for eliminating edges being formed as a result of chamfering, the crowns being respectively formed inside the chamfered ends and being continuous to form a single crown; and
    a rotary steel shaft, said inner ring being mounted on the rotary steel shaft.

2. The bearing according to claim 1, wherein said outer ring and said rolling members are made of a ceramic material.

3. The bearing according to claim 1, wherein said single crown is in the form of a logarithmic curve.

4. A bearing structure for a high temperature atmosphere comprising:
    a rolling bearing having a ceramic inner ring, an outer ring arranged relative to the inner ring and a plurality of rolling members disposed between the inner ring and the outer ring;
    a rotary steel shaft, said inner ring being mounted on the rotary steel shaft at the inner peripheral surface, the rotary steel shaft applying stress to the inner ring as the shaft expands due to high temperatures of the high temperature atmosphere; and
    means for applying the stress substantially uniformly over the inner peripheral surface of the inner ring in an axial direction to thereby avoid stress concentrations as the rotary shaft expands due to the high temperatures of the high temperature atmosphere, the means for applying comprising both ends of the inner peripheral surface of the inner ring being chamfered and crowns for eliminating edges being formed as a result of chamfering, the crowns being respectively formed inside the chamfered ends and being continuous to form a single crown.

5. The bearing structure according to claim 4, wherein said outer ring and said rolling members are made of a ceramic material.

6. The bearing structure according to claim 4, wherein said single crown is in the form of a logarithmic curve.

* * * * *